(12) United States Patent
Jung

(10) Patent No.: US 12,284,144 B2
(45) Date of Patent: Apr. 22, 2025

(54) METHOD OF PROVIDING INFORMATION SHARING INTERFACE, METHOD OF DISPLAYING INFORMATION SHARED IN CHAT WINDOW, AND USER TERMINAL

(71) Applicant: SAMSUNG SDS CO., LTD., Seoul (KR)

(72) Inventor: In Hye Jung, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 82 days.

(21) Appl. No.: 17/824,191

(22) Filed: May 25, 2022

(65) Prior Publication Data

US 2022/0385601 A1 Dec. 1, 2022

(30) Foreign Application Priority Data

May 26, 2021 (KR) .................. 10-2021-0067314

(51) Int. Cl.
*G06F 15/16* (2006.01)
*G06F 3/0482* (2013.01)
*G06F 3/0483* (2013.01)
*G06F 3/0485* (2022.01)
*G06F 3/04883* (2022.01)
*H04L 51/04* (2022.01)
*H04L 51/18* (2022.01)

(52) U.S. Cl.
CPC .......... *H04L 51/04* (2013.01); *G06F 3/0482* (2013.01); *G06F 3/0483* (2013.01); *G06F 3/0485* (2013.01); *G06F 3/04883* (2013.01); *H04L 51/18* (2013.01)

(58) Field of Classification Search
CPC ............. G06F 3/0486; G06F 3/04817; G06F 2203/04806; H04L 51/10
See application file for complete search history.

(56) References Cited

U.S. PATENT DOCUMENTS

| | | | | |
|---|---|---|---|---|
| 8,515,185 | B2* | 8/2013 | Lee .................. | H04N 23/68 |
| | | | | 382/229 |
| 9,773,024 | B2* | 9/2017 | Lee .................. | G06F 3/04883 |
| 10,169,770 | B2 | 1/2019 | Glazier et al. | |
| 10,282,056 | B2* | 5/2019 | Wei .................. | G06F 3/04842 |
| 10,289,294 | B2* | 5/2019 | Chandra ........... | G06F 3/04842 |
| 10,732,793 | B2* | 8/2020 | Park ................. | G06F 3/04845 |
| 10,936,153 | B2* | 3/2021 | Thorsander ...... | G06F 3/04817 |
| 11,714,520 | B2* | 8/2023 | Hwang ............. | G06F 3/04886 |
| | | | | 715/780 |

(Continued)

FOREIGN PATENT DOCUMENTS

| | | | | |
|---|---|---|---|---|
| EP | 1349053 | B1 * | 10/2017 | ........... G06F 3/0481 |
| EP | 2703980 | B1 * | 6/2019 | ............. G06F 17/21 |

(Continued)

*Primary Examiner* — Moustafa M Meky
*Assistant Examiner* — Thorne E Waugh
(74) *Attorney, Agent, or Firm* — Sughrue Mion, PLLC

(57) ABSTRACT

A method of providing an information sharing interface according to an embodiment of the present disclosure includes, when a gesture input for content displayed on a screen is received, switching to a selection mode, receiving a user input for selecting some items of the content in the selection mode, displaying the selected items in a panel area of the screen, and selectively sharing the items displayed in the panel area with at least one target.

14 Claims, 17 Drawing Sheets

(56) References Cited

U.S. PATENT DOCUMENTS

| | | | |
|---|---|---|---|
| 2008/0133675 A1* | 6/2008 | Ramanathan | H04L 51/04 709/206 |
| 2011/0225539 A1* | 9/2011 | Lee | G06F 3/0486 715/810 |
| 2012/0139951 A1* | 6/2012 | Hwang | H04M 1/72415 345/665 |
| 2012/0159472 A1* | 6/2012 | Hong | H04W 4/21 709/204 |
| 2013/0111001 A1* | 5/2013 | Hamilton | H04L 41/04 709/223 |
| 2014/0040747 A1* | 2/2014 | Gardenfors | G06F 3/0482 715/728 |
| 2014/0109004 A1* | 4/2014 | Sadhvani | G06F 3/04883 715/810 |
| 2016/0124589 A1* | 5/2016 | Chae | G06F 3/04842 715/830 |
| 2016/0162173 A1* | 6/2016 | Chandra | G06F 3/04842 715/747 |
| 2018/0088751 A1* | 3/2018 | Han | G06F 3/0483 |
| 2020/0019285 A1* | 1/2020 | Leahy, Jr. | G09B 29/003 |

FOREIGN PATENT DOCUMENTS

| | | | |
|---|---|---|---|
| KR | 20120003665 A * | 1/2012 | |
| KR | 10-2014-0110461 A | 9/2014 | |
| KR | 20150024526 A * | 3/2015 | |
| KR | 10-2016-0031341 A | 3/2016 | |
| KR | 10-2018-0011651 A | 2/2018 | |
| KR | 10-2018-0134517 A | 12/2018 | |
| KR | 10-2020-0000300 A | 1/2020 | |
| KR | 10-2095307 B1 | 3/2020 | |
| KR | 10-2138787 B1 | 7/2020 | |
| WO | WO-2015176385 A1 * | 11/2015 | G06F 17/243 |

* cited by examiner

METHOD OF PROVIDING INFORMATION SHARING INTERFACE, METHOD OF DISPLAYING INFORMATION SHARED IN CHAT WINDOW, AND USER TERMINAL

PRIORITY

This application claims the benefit under 35 USC § 119 of Korean Patent Application No. 10-2021-0067314 filed on May 26, 2021, in the Korean Intellectual Property Office, the entire disclosure of which is incorporated herein by reference for all purposes.

BACKGROUND

1. Field

The present disclosure relates to a method of providing an information sharing interface, a method of displaying information shared in a chat window, and a device for implementing the same, and more particularly, to a method of providing an information sharing interface which enables a user to select and share a desired part of content and display a specific part of the shared content, a method of displaying information shared in a chat window, and a device for implementing the same.

2. Description of the Related Art

To share Internet articles from a web browser or share an image or text information, such as email content, a map, etc., a method of copying a uniform resource locator (URL) and then sharing the URL with others in a messenger is frequently used.

According to the related art, when a specific paragraph or line is selected from an article of long text, such as an Internet article or a long mail, to share the content, if scrolling occurs, the selected area is lost, which is inconvenient.

In addition, when a user wants to share an image, such as a map, there are limitations, such as having to capture the image and then share a part selected through a program (e.g., Microsoft Paint). Also, in the case of sharing a place in the map, it is difficult for a counterpart who receives the place to accurately recognize the distance when enlarging or reducing the map because a distance unit on the map is fixed to kilometers (km).

Further, even when a user wants to share only a part of content in a chat window of a messenger, the URL of the entire content is shared. Accordingly, the user has to switch from the chat window to the corresponding URL window to check the entire content, which is inconvenient.

Accordingly, in the case of sharing content, such as text or an image, a method is required for selectively sharing a part of the content. Also, in the case of checking content shared in a chat window of a messenger, a method is required for immediately checking a shared part through a preview function or the like without a screen change.

SUMMARY

Aspects of the present disclosure provide an information sharing interface providing method for providing a user interface which facilitates selecting and sharing only a part of content rather than the entire content in the case of sharing information of the content, a method of displaying information shared in a chat window, and a device for implementing the same.

Aspects of the present disclosure also provide an information sharing interface providing method which makes it possible to select and rapidly share only a desired part of content regardless of the type of content, such as text, images, etc., and enables a counterpart who receives the shared content to rapidly recognize the shared content without a screen change, a method of displaying information shared in a chat window, and a device for implementing the same.

Aspects of the present disclosure also provide an information sharing interface providing method which allows a plurality of paragraphs or sentences to be selected in content and displayed regardless of scrolling in the case of sharing information of the content, a method of displaying information shared in a chat window, and a device for implementing the same.

It should be noted that objects of the present disclosure are not limited to the above-described objects, and other objects of the present disclosure will be apparent to those skilled in the art from the following descriptions.

According to an aspect of the inventive concept, there is provided a method of providing an information sharing interface performed by a user terminal. The method comprises, when a gesture input for content displayed on a screen is received, switching to a selection mode, receiving a user input for selecting some items of the content in the selection mode, displaying the selected items in a panel area of the screen, and selectively sharing the items displayed in the panel area with at least one target.

The items may include a plurality of items, and the displaying of the selected items in the panel area of the screen may comprise, when a first item is selected in the content, displaying the selected first item in the panel area, and when a second item is selected in the content while the first item is displayed in the panel area, additionally displaying the selected second item in the panel area.

The selective sharing of the items displayed in the panel area with the at least one target may comprise sharing at least one item selected from the first item and the second item displayed in the panel area with the at least one target.

The switching to the selection mode may comprise switching to a mode for selecting at least one of text and an image included in the content.

The gesture input may include a long-press input for the content.

The receiving of the user input for selecting the items of the content in the selection mode may comprise receiving a first type of user input for selecting a plurality of paragraphs in a scrollable webpage which is displayed on the screen.

The receiving of the user input for selecting the items of the content in the selection mode may comprise receiving a second type of user input for selecting a plurality of words or sentences in a scrollable webpage which is displayed on the screen.

The receiving of the user input for selecting the items of the content in the selection mode may comprise generating and displaying a selection graphical user interface (GUI) for selecting a partial area of an image displayed on the screen, and receiving an input for selecting some of a plurality of objects in the partial area of the image selected using the selection GUI.

The selection GUI may be a polygonal interface which is resizable up, down, left, and right.

The displaying of the selected items in the panel area of the screen may comprise, when the items are selected, displaying an icon corresponding to the panel area on one side of the screen, and when the selected items are dragged to the icon, displaying the panel area including the selected items on the side of the screen.

The selective sharing of the items displayed in the panel area with the at least one target may comprise, when a share button displayed in the panel area is selected, displaying a sharing target list, which is stored in advance, on one side of the panel area, and transmitting the items displayed in the panel area to a terminal of a target selected in the sharing target list.

The method may further comprise storing the items displayed in the panel area.

The method may further comprise, when an item selected from among the items displayed in the panel area is dragged to the screen outside the panel area, displaying the items excluding the dragged item in the panel area.

The selective sharing of the items displayed in the panel area with the at least one target may comprise transmitting notification information about an item selected from among the items displayed in the panel area to a terminal of the at least one target, and when there is an input for selecting the notification information from the terminal of the at least one target, transmitting the selected item to the terminal of the at least one target.

According to an aspect of the inventive concept, there is provided a method of displaying information shared in a chat window. The method comprises displaying notification information shared by an external device in a chat window, and displaying content, which is shared by the external device in relation to the notification information, in different modes depending on types of user inputs for the notification information displayed in the chat window.

The displaying of the notification information shared by the external device in the chat window may comprise receiving uniform resource locator (URL) information of the content shared by the external device, and displaying the received URL information of the content in the chat window as notification information, wherein the URL information includes a modified URL obtained by adding highlight processing information for some items of the content selected at the external device to an original URL of the content.

The displaying of the content shared by the external device may comprise, when a first type of user input for the notification information is received, displaying some items of the content selected at the external device in relation to the notification information in a preview mode, and when a second type of user input for the notification information is received, displaying the content shared by the external device in relation to the notification information in an overview mode and displaying some items of the content selected at the external device in highlight.

The first type of user input may be a long-press input, and the second type of user input may be a click input.

According to an aspect of the inventive concept, there is provided a user terminal comprising a communicator configured to communicate with an external device, a user input part configured to receive an input of a user, a display configured to display information, and a processor configured to switch to a selection mode when a gesture input for content displayed on a screen of the display is received, receive a user input for selecting some items of the content in the selection mode, display the selected items in a panel area of the screen, and control the communicator to selectively share the items displayed in the panel area with at least one target.

According to an aspect of the inventive concept, there is provided a user terminal comprising at least one processor, a communicator configured to communicate with an external device, a memory configured to load a computer program executed by the processor, and a storage configured to store the computer program, wherein the computer program comprises instructions for displaying notification information shared by an external device in a chat window, and displaying content, which is shared by the external device in relation to the notification information, in different modes depending on types of user inputs for the notification information displayed in the chat window.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
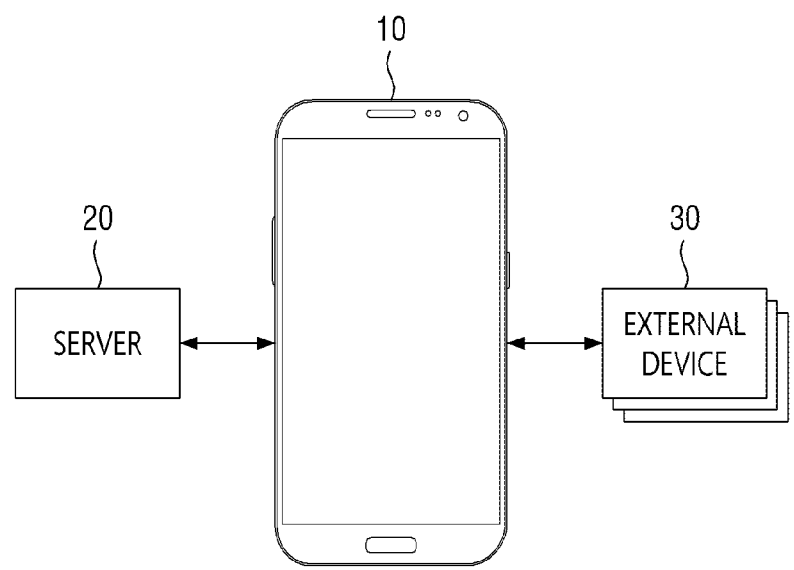
FIG. 1 is a diagram showing a configuration of a system for providing an information sharing interface according to an exemplary embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram showing a configuration of a system for providing an information sharing interface according to an exemplary embodiment of the present disclosure. Referring to FIG. 1, the system according to the exemplary embodiment of the present disclosure includes a user terminal 10, a server 20, and a plurality of external devices 30.

The user terminal 10 is a device that provides an environment in which applications, such as a web browser, a mail program, etc., may be installed and executed. For example, the user terminal 10 may be implemented as a display device, such as a smart phone, a tablet, a personal computer (PC), a laptop, etc.

The server 20 may be implemented as a web server or an email server that is connected to the user terminal 10 via a network and provides content and is not limited to a specific type of server. The server 20 may receive a request for specific content, such as an Internet article, a breakdown of mail, a map image, etc., from the user terminal 10 and provide the requested content to the user terminal 10. Also, the server 20 may store history related to information requested by the user terminal 10 and information provided to the user terminal 10.

In the shown configuration, the user terminal 10 may provide a function of displaying the content received from the server 20 on a screen, selecting a part of the content displayed on the screen, and sharing the selected part of the content with at least one of the external devices 30. Here, the external device 30 may be, for example, a display device, such as a smart phone, a tablet, a PC, a laptop, etc.

According to an exemplary embodiment, when a gesture input is received for the content displayed on the screen, the user terminal 10 may switch to a selection mode, receive a user input for selecting some items of the content in the selection mode, and display the selected items in a panel area of the screen. The user terminal 10 may selectively share the items displayed in the panel area with at least one target. In this case, to share the items displayed in the panel area, notification information about the shared items may be transmitted to the external device 30 which is at least one target terminal.

As described above, in the case of sharing information of content displayed on the screen, the configuration of the system according to the exemplary embodiment of the present disclosure allows only a desired part of the content regardless of the type of content, such as text, images, etc., to be rapidly selected and shared with a desired target.

Figure 2:
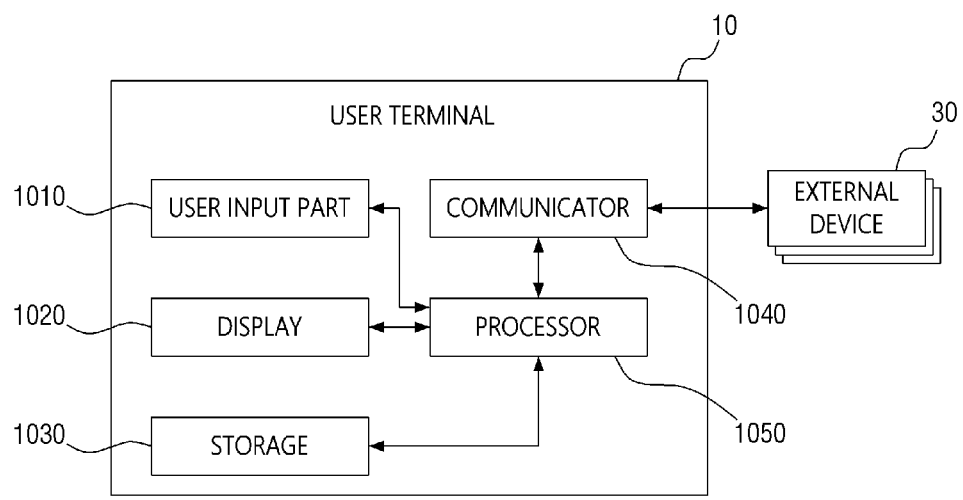
FIG. 2 is a block diagram showing a configuration of a user terminal according to an exemplary embodiment of the present disclosure.

FIG. 2 is a block diagram showing a configuration of a user terminal according to an exemplary embodiment of the present disclosure. Referring to FIG. 2, the user terminal 10 according to the exemplary embodiment of the present disclosure includes a communicator 1040, a display 1020, a storage 1030, a user input part 1010, and a processor 1050 and may communicate with the plurality of external devices 30 through the communicator 1040.

The communicator 1040 communicates with the plurality of external devices 30 using a wired or wireless communication method. The communicator 1040 may communicate with the plurality of external devices 30 using a wired communication method, such as Ethernet or the like, or may communicate with the plurality of external devices 30 using a mobile communication network or a wireless communication method, such as WiFi, Bluetooth, etc. A communication method of the communicator 1040 is not limited thereto, and the communicator 1040 may perform communication using another communication method.

The display 1020 displays information. For example, the display 1020 may render and display content received from the server 20 and information displayed by an application program installed on the user terminal 10. The display 1020 may be implemented in various forms, such as a plasma display panel (PDP), a liquid crystal display (LCD), an organic light emitting diode (OLED) display, a flexible display, etc.

The user input part 1010 receives a user input. For example, the user input part 1010 may receive a user input for selecting a menu or item in a user interface displayed on the display 1020 or selecting a part of displayed content. The user input part 1010 may be implemented as a touchscreen provided in the user terminal 10 or a keyboard, a mouse, etc. which is connected to the user terminal 10.

The storage 1030 may store information on some items selected by a user in content displayed on the screen of the user terminal 10, and when the selected items are shared, manage information on the shared items and information on a sharing target.

When a gesture input is received for content displayed on the screen of the display 1020, the processor 1050 switches to the selection mode. The gesture input may be a long-press input for the content. In addition, the gesture input may be set in various forms, such as a horizontal sliding input, a vertical sliding input, a continuous double click, etc. The selection mode may be set to a mode for selecting at least one of text and an image included in the content.

According to an exemplary embodiment, when the processor 1050 is switched to the selection mode, the processor 1050 may generate and display a functional icon to allow selection of text or images in content displayed on the screen. For example, as the functional icon, an icon for performing a highlight pen function and an icon for performing an eraser function may be displayed.

In the selection mode, the processor 1050 receives a user input for selecting some items of content and controls the display 1020 to display the selected items in the panel area of the screen. Also, the processor 1050 controls the communicator 1040 to selectively share the items displayed in the panel area with at least one target. The items may include a plurality of items, such as text, images, etc., present in the content.

According to an exemplary embodiment, the processor 1050 may control the display 1020 to display, when a first item is selected in the content, the selected first item in the panel area of the screen and to display, when a second item is additionally selected in the content, the additionally selected second item together with the already displayed first item in the panel area. In this case, the processor 1050 may control the communicator 1040 to share at least one item, which is selected from among the first item and the second item displayed in the panel area, with at least one target. For example, while the first item and the second item are both displayed in the panel area, the first item may be selected and shared with a first target, and the second item may be selected and shared with a second target.

According to an exemplary embodiment, in the selection mode, the processor 1050 may receive a first type of user input for selecting a plurality of paragraphs in a scrollable webpage which is displayed on the screen. The first type of user input may be, for example, a circular-mark input based on the highlight pen function or mouse handling.

Also, in the selection mode, the processor 1050 may receive a second type of user input for selecting a plurality of words or sentences in a scrollable webpage which is displayed on the screen. The second type of user input may be, for example, a drag input based on the highlight pen function or mouse handling.

According to an exemplary embodiment, in the selection mode, the processor 1050 may generate and display a selection graphical user interface (GUI) for selecting a partial area of an image displayed on the screen and receive an input for selecting a part of a plurality of objects present in a partial area of an image selected through the selection GUI. The selection GUI may be implemented as a polygonal interface that is resizable up, down, left, and right.

According to an exemplary embodiment, the processor 1050 may control the display 1020 to display, when some items in the content are selected in the selection mode, an icon corresponding to the panel area on one side of the screen and to display, when the selected items are dragged toward the icon, the panel area including the selected items.

According to an exemplary embodiment, when a share button displayed in the panel area of the screen is selected, the processor 1050 may display a sharing target list on one side of the panel area and control the communicator 1040 to transmit some items of content displayed in the panel area to a terminal of a target selected in the sharing target list.

With the above-described configuration of the user terminal 10 according to the exemplary embodiment of the present disclosure, it is possible to provide a convenient user interface for selecting and sharing only a part of content rather than the entire content. Also, regardless of content type, such as text, images, etc., only a desired part can be selected and rapidly shared, and even when scrolling occurs, a plurality of paragraphs or sentences in content can be selected and displayed.

As described above, in the exemplary embodiment of FIG. 2, the user terminal 10 is a device that may select a part of content displayed on the screen and share the selected part of content with the external device 30. On the other hand, the user terminal 10 may also be implemented as a device that may display a part of content shared by the external device 30 in a chat window.

Figure 3:
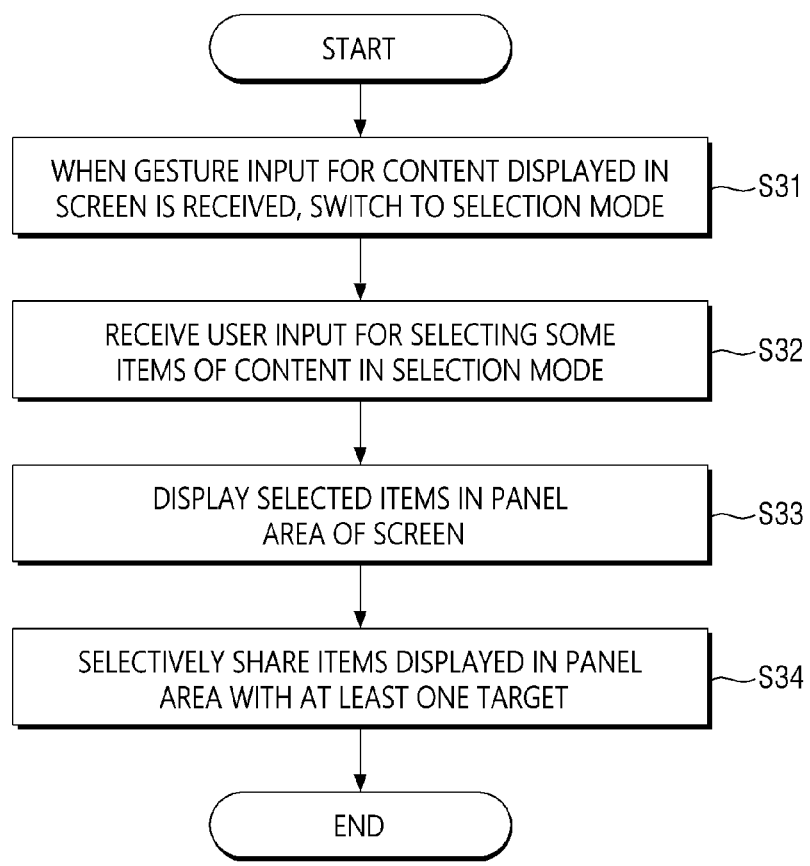
FIGS. 3 to 5 are flowcharts illustrating a method of providing an information sharing interface according to another exemplary embodiment of the present disclosure.
Figure 4:
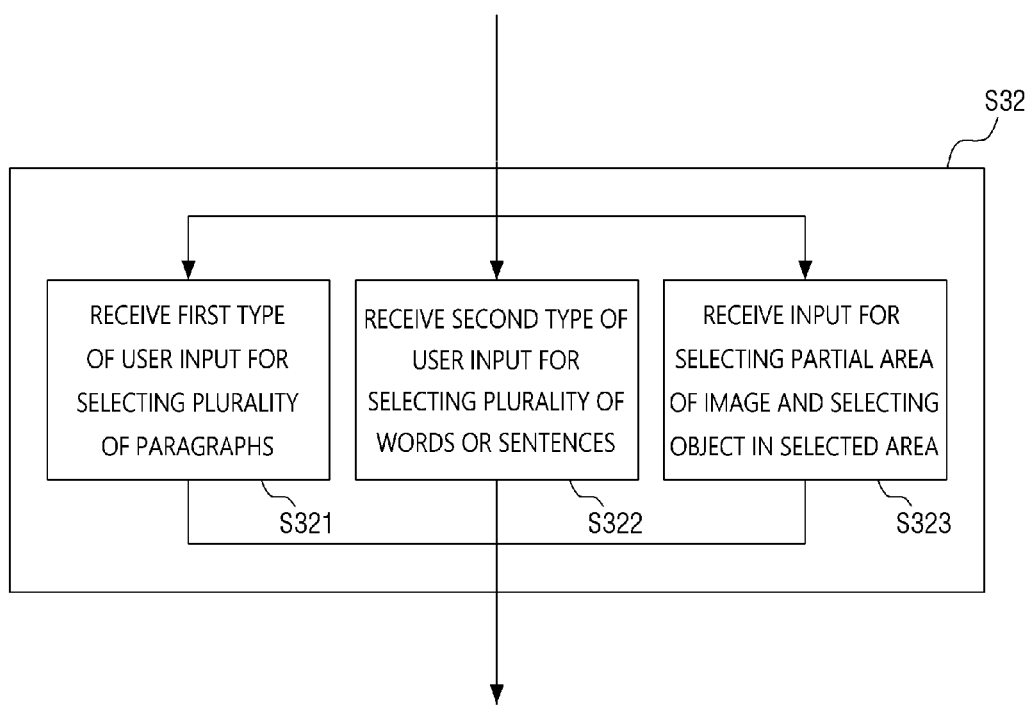
Figure 5:
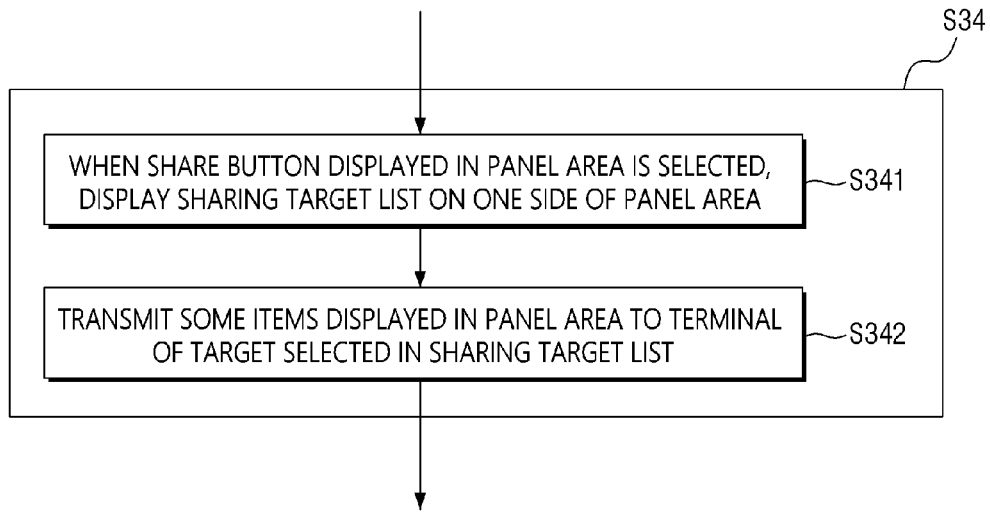

FIGS. 3 to 5 are flowcharts illustrating a method of providing an information sharing interface according to another exemplary embodiment of the present disclosure.

The method of providing an information sharing interface according to the exemplary embodiment of the present disclosure may be performed by a computing device 100, for example, the user terminal 10 of FIG. 1. The computing device 100 which performs the method according to the present embodiment may be a computing device having an application program execution environment. In some operations included in the method according to the exemplary embodiment of the present disclosure, a subject that performs the operations may not be indicated. In this case, it is to be noted that the subject is the computing device 100.

Referring to FIG. 3, in operation S31, when a gesture input for content displayed on the screen is received, the computing device 100 is switched to the selection mode. The gesture input may be a long-press input for the content.

According to an exemplary embodiment, operation S31 may include an operation of switching to a mode for selecting at least one of text and an image included in the content.

Subsequently, in operation S32, a user input for selecting some items of the content is received in the selection mode, and in operation S33, the selected items are displayed in the panel area of the screen.

Referring to FIG. 4, operation S32 may include operation S321 of receiving a first type of user input for selecting a plurality of paragraphs in a scrollable webpage which is displayed on the screen. Also, operation S32 may include operation S322 of receiving a second type of user input for selecting a plurality of words or sentences in a scrollable webpage which is displayed on the screen.

Further, operation S32 may include operation S323 of receiving an input for selecting a partial area of an image displayed on the screen and selecting an object in the selected area. Operation S323 may include an operation of generating and displaying a selection GUI for selecting the partial area of the image displayed on the screen and an operation of receiving an input for selecting some of a plurality of objects present in the partial area of the image selected through the selection GUI. The selection GUI may be implemented as a polygonal interface that is resizable up, down, left, and right.

According to an exemplary embodiment, operation S33 may include an operation of displaying, when the items are selected in the content, a panel area including the selected items on one side of the screen. The panel area may be basically set to a hidden mode. When the items are selected in the content, the hidden mode may be turned off, and the panel area may be displayed.

According to an exemplary embodiment, operation S33 may include an operation of displaying, when the items are selected in the content, an icon corresponding to the panel area on one side of the screen and an operation of displaying, when the selected items are dragged toward the icon, the panel area including the selected items.

When some items are selected in the content, the icon corresponding to the panel area may perform a function of storing the selected items like a drawer. For example, when the selected items are dragged toward to the icon, the panel area which has not been shown on the screen is opened, and some items contained in the icon may be displayed in the panel area.

According to an exemplary embodiment, operation S33 may further include an operation of storing the items displayed in the panel area. Also, operation S33 may further include an operation of displaying, when an item selected from the items displayed in the panel area is dragged to the screen out of the panel area, displaying the items excluding the dragged item in the panel area.

Finally, in operation S34, the items displayed in the panel area are selectively shared with at least one target.

Referring to FIG. 5, operation S34 may include operation S341 of displaying, when a share button displayed in the panel area is selected, a sharing target list stored in advance on one side of the panel area and operation S342 of transmitting some items of content displayed in the panel area to a terminal of a target selected in the sharing target list.

According to an exemplary embodiment, in operation S34, a first item group may be selected from among the items displayed in the panel area and then shared with a first target group in the sharing target list, and a second item group different from the first item group may be selected from among the items and then shared with a second target group different from the first target group in the sharing target list. For example, when objects denoting specific places are selected in a map image and displayed in the panel area, a first place may be selected from among the displayed objects and shared with the first target group in the sharing target list, and a second place may be selected and shared with the second target group. When a plurality of places are shared, the places may be specified with an order and shared.

Also, operation S34 may include an operation of transmitting notification information about an item selected from among the items displayed in the panel area to a terminal of at least one target and an operation of transmitting, when there is an input for selecting the notification information from the terminal of the at least one target, the selected item to the terminal of the at least one target.

With the above-described method of providing an information sharing interface according to the exemplary embodiment of the present disclosure, it is possible to provide a convenient user interface for selecting and rapidly sharing a plurality of desired parts of content regardless of content type, such as text, images, etc. Also, even when scrolling occurs while text, such as Internet articles, mail, etc., is shared, a plurality of paragraphs or sentences can be selected and shared.

Figure 6:
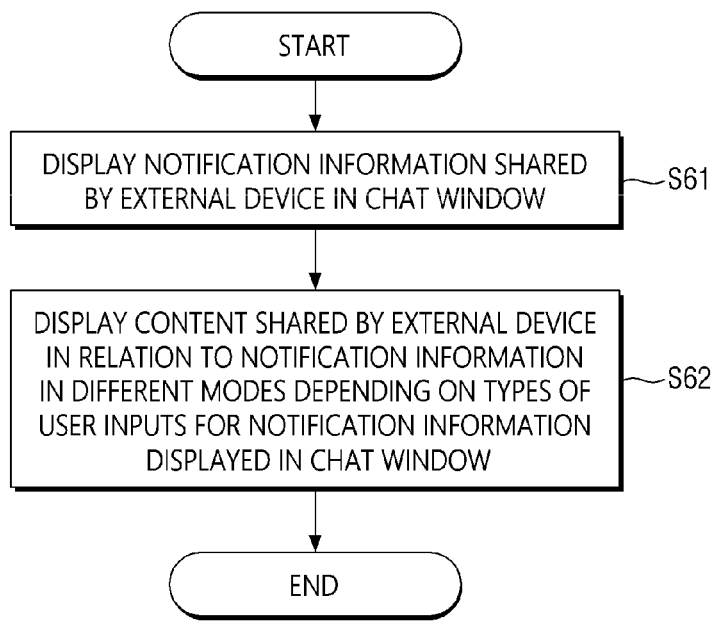
FIG. 6 is a flowchart illustrating a method of displaying information shared in a chat window according to still another exemplary embodiment of the present disclosure.

FIG. 6 is a flowchart illustrating a method of displaying information shared in a chat window according to still another exemplary embodiment of the present disclosure.

The method of displaying information shared in a chat window according to the exemplary embodiment of the present disclosure may be performed by the computing device 100. The computing device 100 which performs the method according to the present embodiment may be a computing device or the user terminal 10 having an application program execution environment. In some operations included in the method according to the exemplary embodiment of the present disclosure, a subject that performs the operations may not be indicated. In this case, it is to be noted that the subject is the computing device 100.

Referring to FIG. 6, in operation S61, notification information shared by an external device is displayed first in a chat window.

According to an exemplary embodiment, operation S61 may include an operation of receiving uniform resource locator (URL) information of shared content from an external device and an operation of displaying the received URL information of the content in the chat window as notification information.

The URL information may include a modified URL obtained by adding highlight processing information for some items of the content selected at the external device to the original URL of the content. The URL information may be provided by the external device which corresponds to a terminal of another user or a server which provides a messenger service including a chat window function. The server may be implemented as a device that provides the messenger service among a plurality of user terminals.

Subsequently, in operation S62, content shared by the external device in relation to the notification information is displayed in different modes depending on a type of user input for the notification information displayed in the chat window.

According to an exemplary embodiment, operation S62 may include an operation of displaying some items of the content selected at the external device in relation to the notification information in a preview mode when the first type of user input for the notification information is received and an operation of displaying the content shared by the external device in relation to the notification information in an overview mode and displaying some items of the content selected at the external device in highlight when the second type of user input for the notification information is received. Here, the first type of user input may be set as a long-press input, and the second type of user input may be set as a click input. The settings of the first and second types of user inputs are not limited to the present exemplary embodiment and may vary depending on users.

For example, a URL shared by the external device and a partial capture image of a URL page may be displayed in the chat window. In this case, when there is a long-press input for the URL or capture image, some items of the content which are selected and highlighted at the external device may be displayed in the preview mode.

Also, when there is a click input for the URL or capture image displayed in the chat window, the entire page of the URL shared by the external device may be displayed in the overview mode, and the items selected by a user of the external device in the entire page of the URL may be displayed in highlight.

The URL displayed in the chat window may be a modified URL obtained by adding highlight processing information for the items of the content selected at the external device to the original URL of the content shared by the external device.

As described above, when content is shared by another user, the method of displaying information shared in a chat window according to the exemplary embodiment of the present disclosure allows the shared content to be rapidly recognized and displayed without a screen change, and thus a user's convenience is improved.

Figure 7:
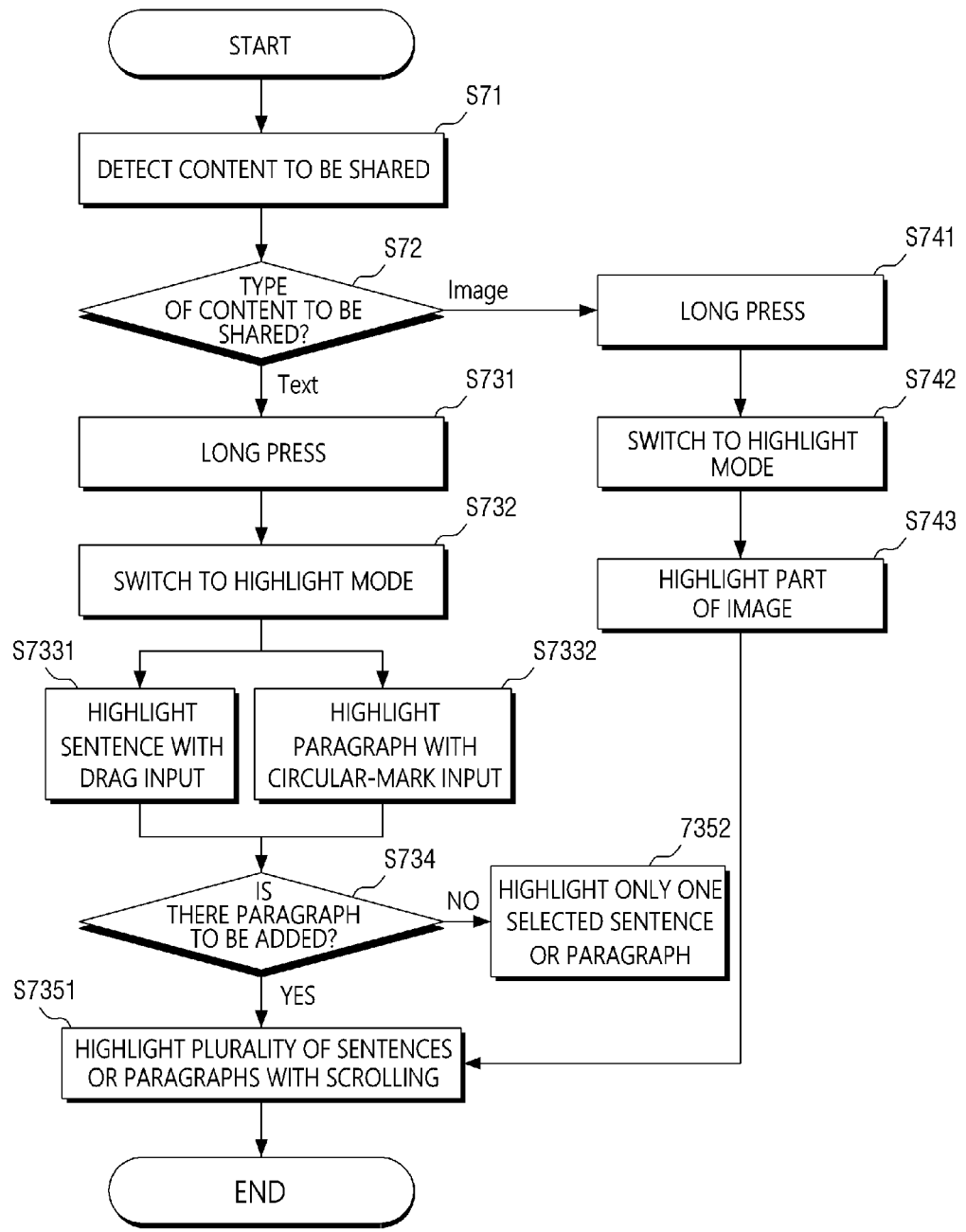
FIG. 7 illustrates an example of a flow of selecting and highlighting a part of content in a web browser according to some exemplary embodiments of the present disclosure.

FIG. 7 illustrates an example of a flow of selecting and highlighting a part of content in a web browser according to some exemplary embodiments of the present disclosure.

Referring to FIG. 7, a process of selecting a part of text content in a web browser and sharing the selected part of content may be performed by the user terminal 10.

When content to be shared is detected in a web browser in operation S71, it is determined whether a type of content to be shared is text or an image in operation S72. When it is determined in operation S72 that the type of content is text, there may be a long-press input for the content in operation S731. Then, in operation S732, the user terminal 10 may be switched to the highlight mode, and icons for performing a highlight pen function and an eraser function may be displayed at the upper end of the screen so that highlight processing may be performed on the text.

Subsequently, in the switched highlight mode, a plurality of sentences in the content may be highlighted by a drag input in operation S7331, or a plurality of paragraphs in the content may be highlighted by a circular-mark input in operation S7332.

Subsequently, in operation S734, it is determined whether there is a paragraph to be added. When there is a paragraph to be added, a plurality of sentences or paragraphs may be additionally highlighted through scrolling in operation S7351. When there is no paragraph to be added, only one selected sentence or paragraph may be highlighted in operation S7352.

When it is determined in operation S72 that the type of content is an image, there may be a long-press input for the content in operation S741. Then, in operation S742, the user terminal 10 may be switched to the highlight mode, and icons for performing the highlight pen function and the eraser function may be displayed at the upper end of the screen so that highlight processing may be performed on the image.

Subsequently, in operation S743, a part of the image may be selected and highlighted in the switched highlight mode.

As described above, according to the exemplary embodiment of the present disclosure, it is possible to provide a convenient user interface for switching to the highlight mode with a simple gesture and easily selecting a desired part of content regardless of content type, such as text, images, etc.

Figure 8:
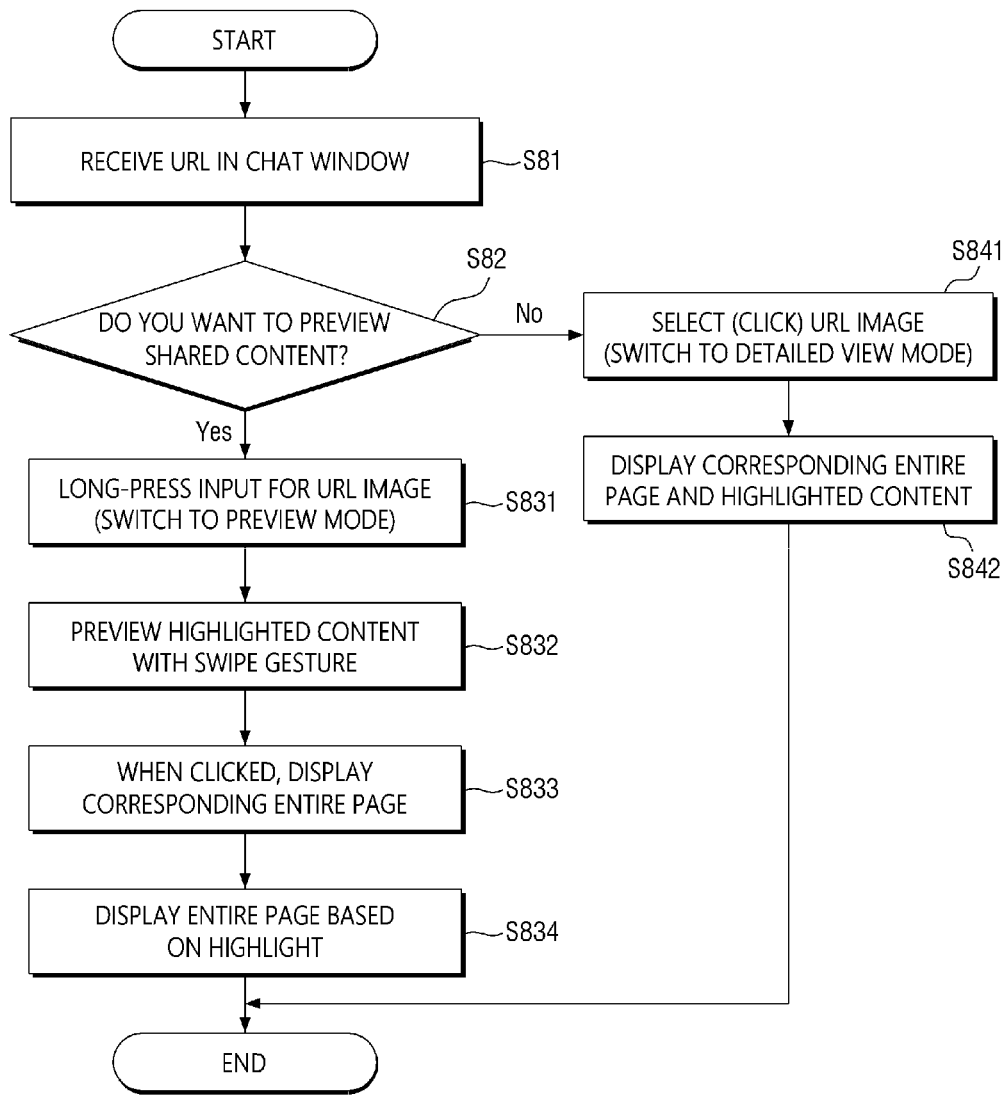
FIG. 8 illustrates an example of a flow of displaying content shared in a chat window in a preview or detailed view mode in the case of checking the content according to some exemplary embodiments of the present disclosure.

FIG. 8 illustrates an example of a flow of displaying content shared in a chat window in a preview or detailed view mode in the case of checking the content according to some exemplary embodiments of the present disclosure. Referring to FIG. 8, a process of checking content shared in a chat window of a messenger may be performed by the user terminal 10.

When a URL shared by an external device is displayed in a chat window in operation S81, it is determined in operation S82 whether a user wants to preview shared content. When it is determined that the user wants to preview the shared content, a long-press input may be performed for a URL image displayed together with the URL in the chat window to switch to the preview mode in operation S831. The URL image may be an image obtained by capturing a part of an entire page of the URL.

In operation S832, in the preview mode, a plurality of items which have been selected in the entire page of the shared URL and highlighted at the external device are displayed. In this case, the highlighted plurality of items may be previewed using a right-to-left swipe gesture.

Subsequently, when a specific item is clicked during the preview of the highlighted plurality of items, the entire page of the URL may be displayed in operation S833. Also, in operation S834, the entire page of the URL may be displayed on the basis of a specific highlighted item.

Also, when it is determined in operation S82 that a user does not want to preview the shared content but wants to see the shared content in detail, a click input may be made for the URL image to switch to the detailed view mode in operation S841.

In operation S842, in the detailed view mode, the entire page of the shared URL is displayed. In this case, the plurality of items selected in the entire page at the external device may be displayed in the highlighted state.

As described above, according to the exemplary embodiment of the present disclosure, it is possible to provide an interface that is distinguished by allowing rapid recognition of content shared in a chat window without a screen change, and it is possible to easily understand a main part of content shared by a counterpart because a highlighted part of the shared content is displayed first.

Figure 9:
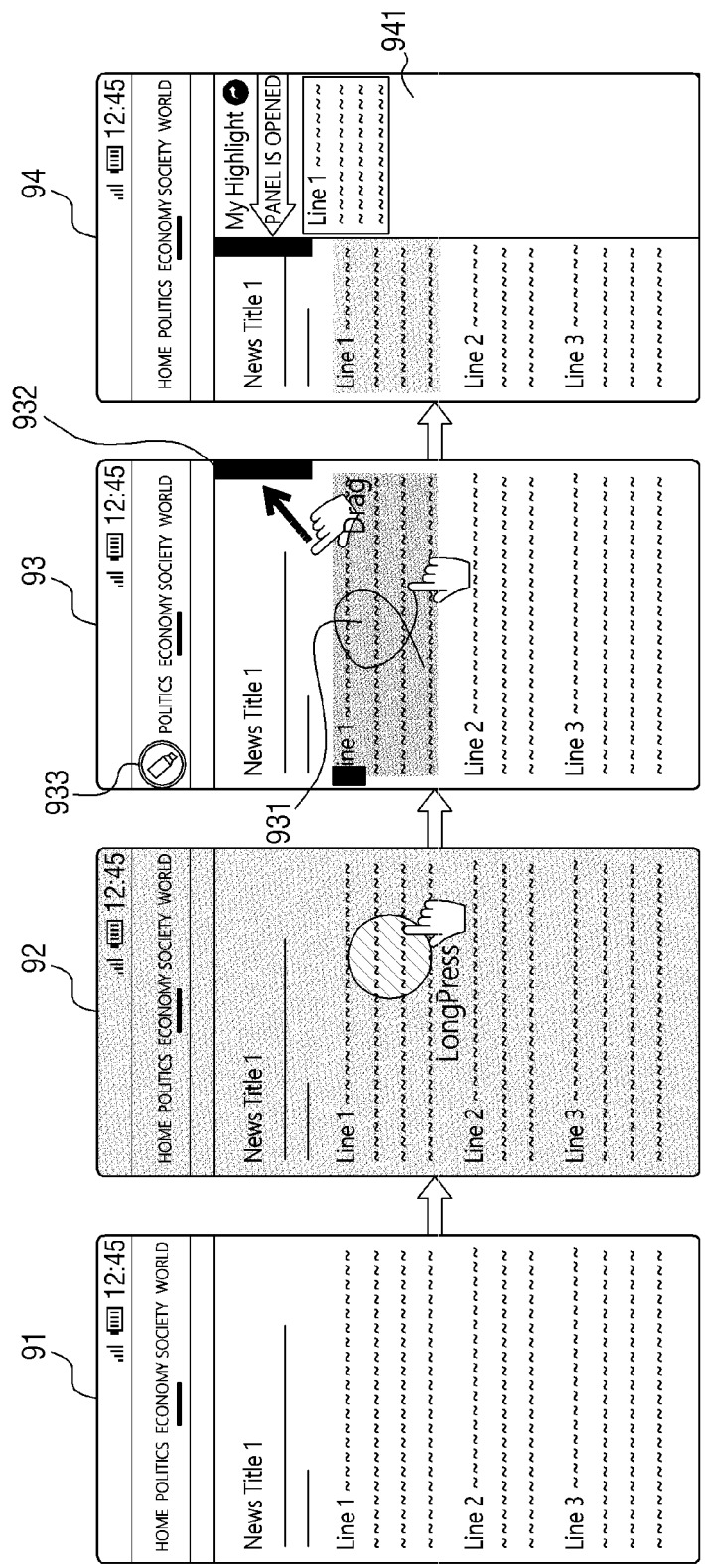
FIGS. 9 and 10 are an example of selecting and sharing a plurality of paragraphs according to some exemplary embodiments of the present disclosure when content is a text type.
Figure 10:
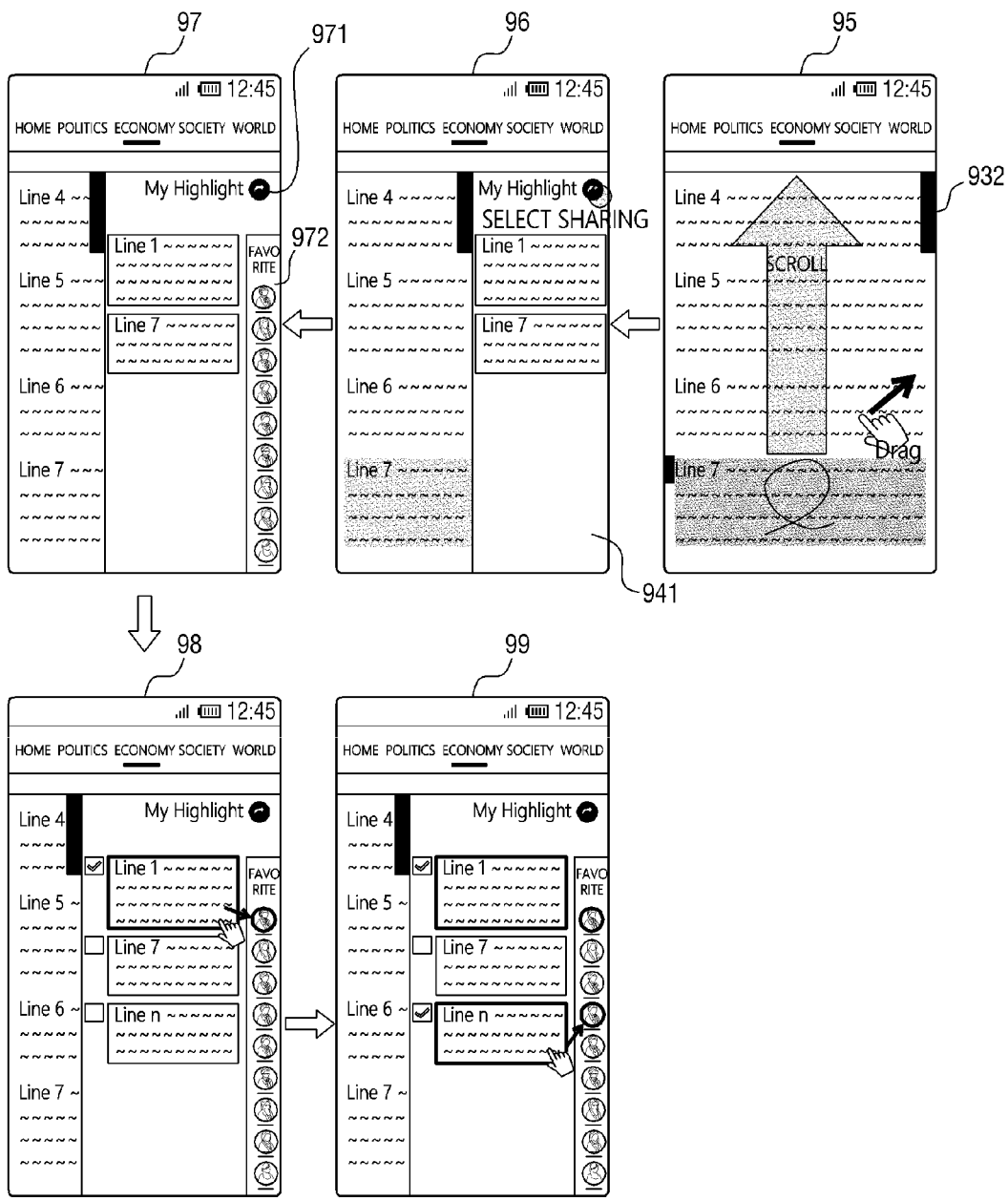

FIGS. 9 and 10 are an example of selecting and sharing a plurality of paragraphs according to some exemplary embodiments of the present disclosure when content is a text type.

Referring to FIG. 9, when a long-press input is received 92 for an Internet article 91 displayed in a web browser, the user terminal 10 may be switched to a selection mode 93 for selecting a part of the Internet article. In the selection mode 93, an icon 933 for performing a highlight pen function may be displayed at the upper end of the screen.

In the example shown in the drawing, when a paragraph to be shared is selected in the entire page of the Internet article through a circular-mark input 931 using the icon 933 of the highlight pen function in the switched selection mode 93, the user terminal 10 may display 94 the selected paragraph in a panel area 941 on the right side of the screen. The panel area 941 is set to the hidden mode and is not displayed on the screen, but when the paragraph to be shared is selected, the panel area 941 may be displayed on the screen.

According to an exemplary embodiment, when the paragraph to be shared is selected through the circular-mark input 931 and then dragged toward an icon 932 of a drawer function displayed on the upper right side of the screen, the user terminal 10 may display 94 the selected paragraph in the panel area 941 on the right side of the screen. At this time, the paragraph displayed in the panel area 941 may be stored in the device, and a corresponding URL, the position and content of the paragraph, a storage date, etc. may be stored together.

Referring to FIG. 10, the user terminal 10 may scroll an Internet article displayed in the web browser and then additionally select 95 a paragraph through a circular-mark input. When the paragraph is additionally selected, the additionally selected paragraph may be displayed in the panel area 941 together with the initially selected paragraph. As another example, when the additional paragraph is selected and then dragged to the icon 932 of the drawer function displayed on the upper right side of the screen, the additionally selected paragraph may be displayed 96 in the panel area 941 together with the initially selected paragraph.

Also, the user terminal 10 may display a share button 971 at the upper right corner of the panel area 941. When the share button 971 is selected, the user terminal 10 may display a sharing target list 972 on the right side of the panel area 941. The sharing target list 972 may include, for example, a favorite friend list stored in advance.

According to an exemplary embodiment, the user terminal 10 may select one of a plurality of paragraphs displayed in the panel area 941 and share 98 the selected paragraph with an individual or company included in the sharing target list 972. Also, the user terminal 10 may select a plurality of paragraphs from among a plurality of paragraphs displayed in the panel area 941 and share 99 the selected paragraphs with an individual or a plurality of people included in the sharing target list 972.

Figure 11:
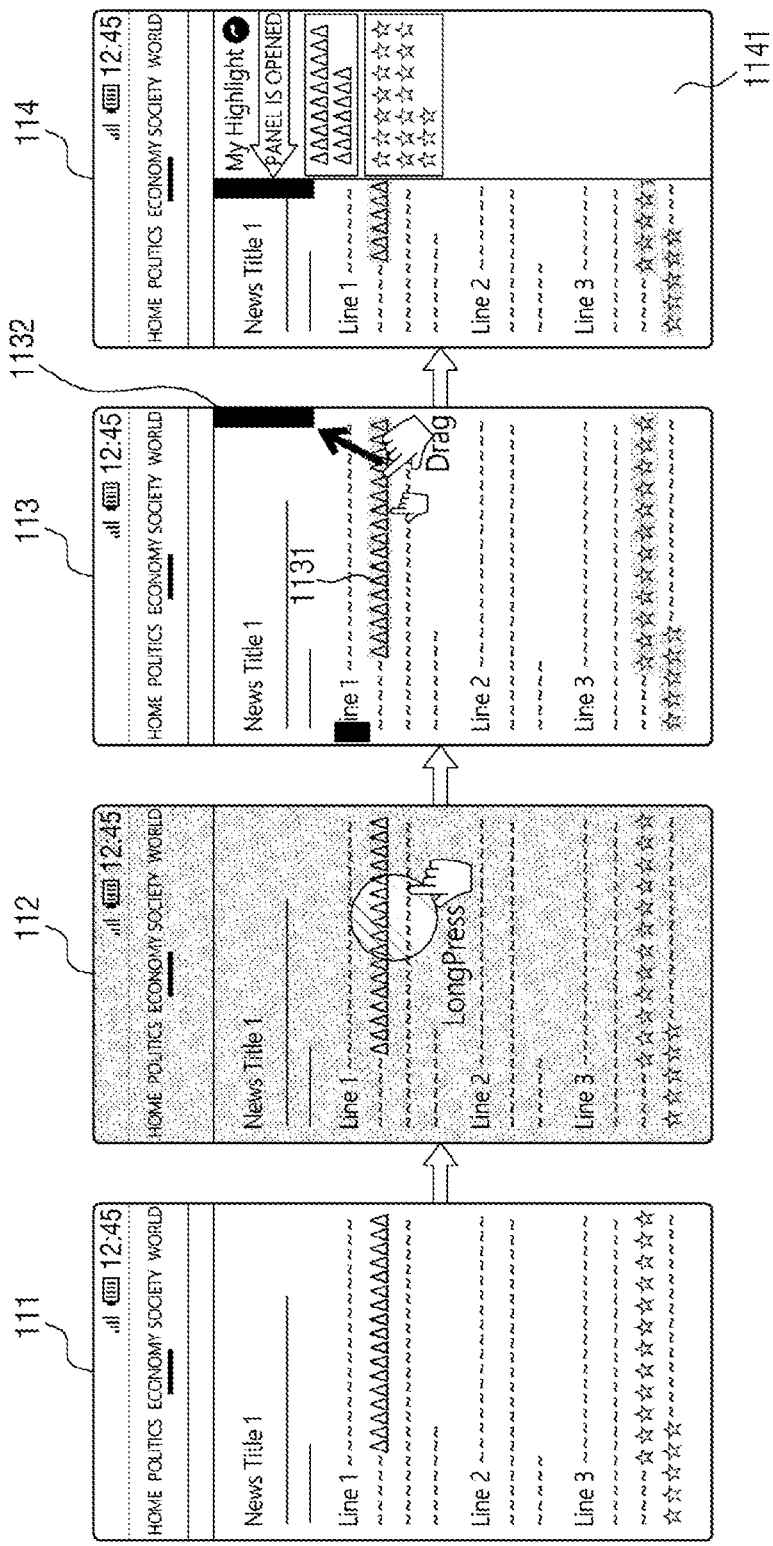
FIGS. 11 and 12 are an example of selecting and sharing a plurality of sentences or words according to some exemplary embodiments of the present disclosure when content is a text type.
Figure 12:
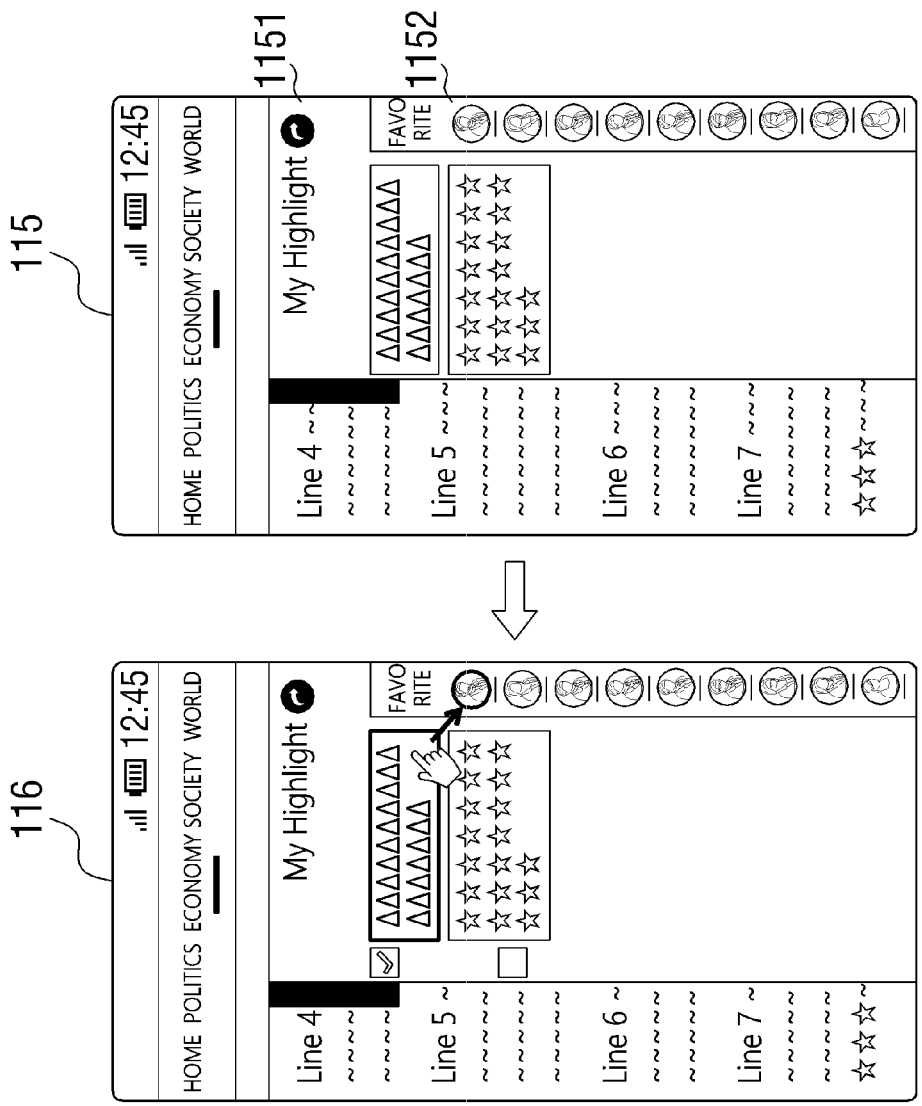

FIGS. 11 and 12 are an example of selecting and sharing a plurality of sentences or words according to some exemplary embodiments of the present disclosure when content is a text type.

Referring to FIG. 11, when a long-press input is received 112 for an Internet article 111 displayed in a web browser, the user terminal 10 may be switched to a selection mode 113 for selecting a part of the Internet article.

In the example shown in the drawing, when a sentence or word to be shared is selected in the entire page of the Internet article through a drag input 1131 in the switched selection mode 113, the user terminal 10 may display 114 the selected sentence or word in a panel area 1141 on the right side of the screen. The panel area 1141 is set to the hidden mode and is not displayed on the screen, but when the sentence or word to be shared is selected, the panel area 1141 may be displayed on the screen.

According to an exemplary embodiment, when the sentence or word to be shared is selected through the drag input 1131 and then dragged toward an icon 1132 of the drawer function displayed on the upper right side of the screen, the user terminal 10 may display 114 the selected sentence or word in the panel area 1141 on the right side of the screen.

Referring to FIG. 12, the user terminal 10 may display a share button 1151 at the upper right corner of the panel area 1141. When the share button 1151 is selected, the user terminal 10 may display a sharing target list 1152 on the right side of the panel area 1141. The sharing target list 1152 may include, for example, a favorite friend list stored in advance.

According to an exemplary embodiment, the user terminal 10 may select one or more of a plurality of sentences or words displayed in the panel area 1141 and share 116 the selected sentences or words with an individual or a plurality of targets included in the sharing target list 1152.

Figure 13:
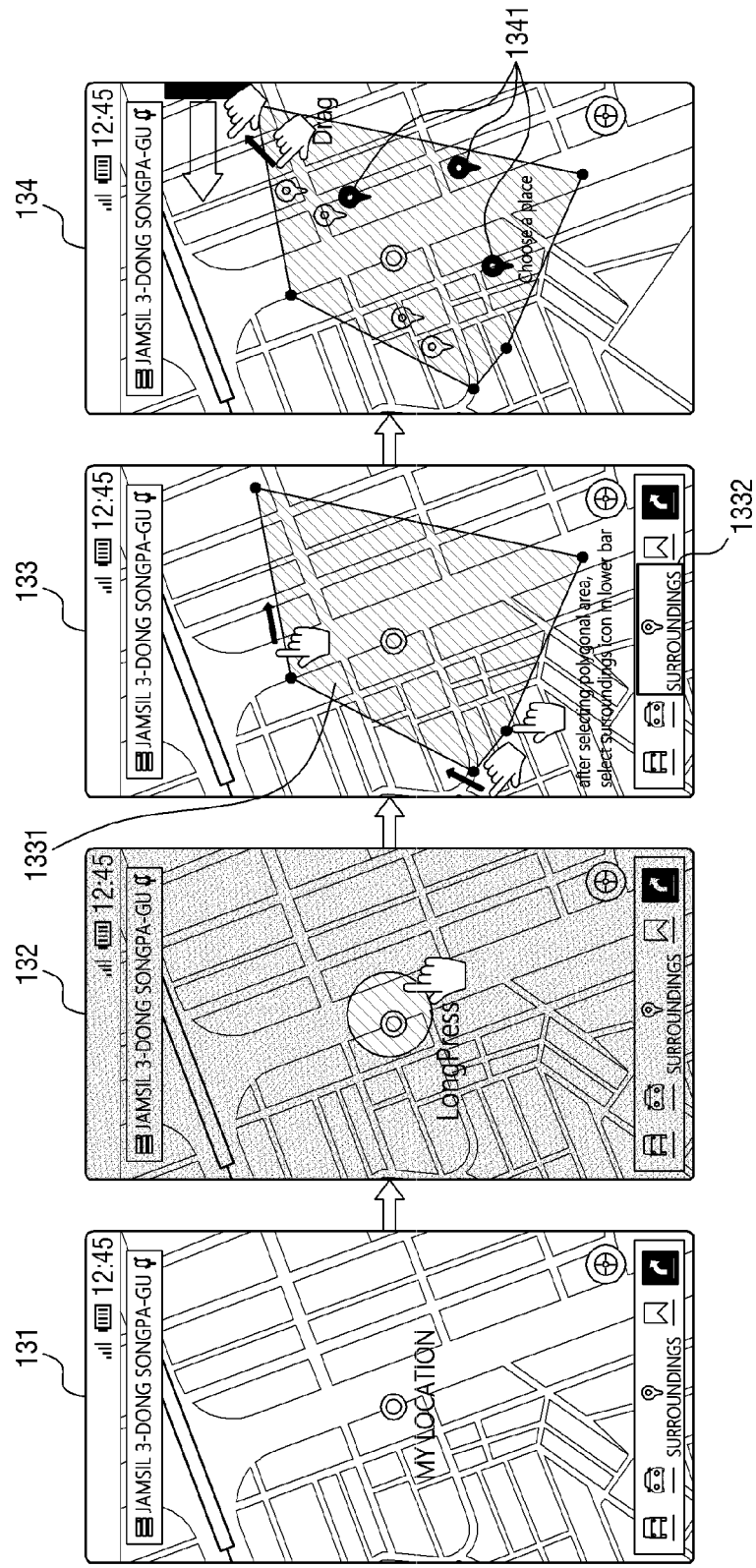
FIGS. 13 and 14 are an example of selecting and sharing a part of an image using a polygonal graphical user interface (GUI) according to some exemplary embodiments of the present disclosure when content is an image type.
Figure 14:
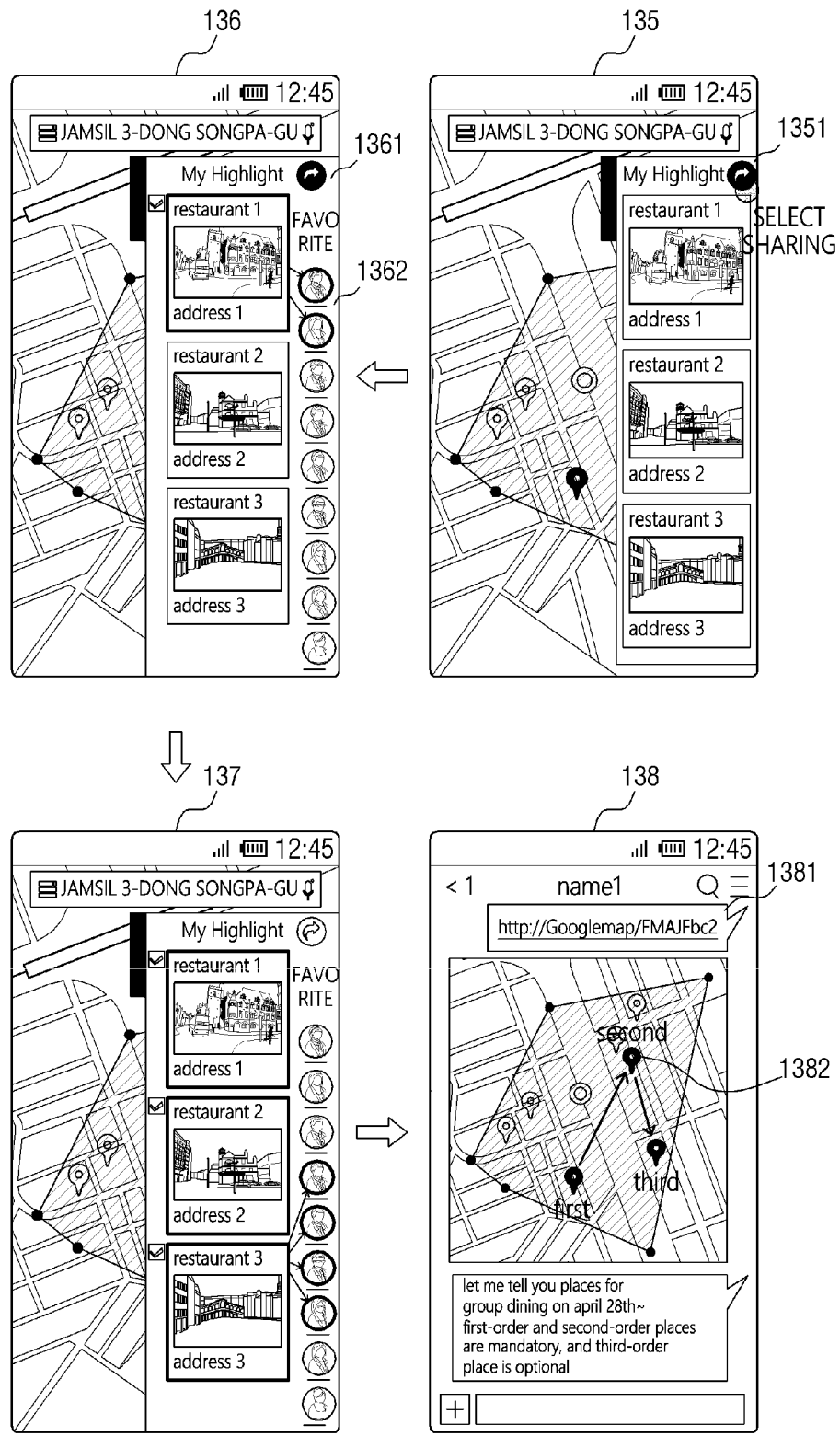

FIGS. 13 and 14 are an example of selecting and sharing a part of an image using a polygonal GUI according to some exemplary embodiments of the present disclosure when content is an image type.

Referring to FIG. 13, when a long-press input is received 132 for a map image 131 displayed on the screen, the user terminal 10 may be switched to a selection mode 133 for selecting a part of the map image 131. When the user terminal 10 is switched to the selection mode 133, a polygonal user interface (UI) 1331 may be displayed on the map image 131 as an interface for selecting a part of the map image 131. The polygonal UI 1331 may be implemented in a form in which a size may be increased or reduced up, down, left, and right such that a desired area may be selected on the map image 131.

In the example shown in the drawing, when a desired area is selected in the map image 131 using the polygonal UI 1331 and then a surroundings icon 1332 at the lower end of the screen is selected, the user terminal 10 may display 134 a plurality of places 1341 in the area selected using the polygonal UI 1331.

Referring to FIG. 14, when one or more of the plurality of places 1341 are selected while the plurality of places 1341 in the area selected in the map image 131 using the polygonal UI 1331 are displayed 134, the user terminal 10 may display a panel area 1351 on the right side of the screen and display 135 the selected places in the panel area 1351. The panel area 1351 is set to the hidden mode and is not displayed on the screen, but when the one or more places are selected, the panel area 1351 may be displayed on the screen.

In the example shown in the drawing, the user terminal 10 may display a share button 1361 at the upper right corner of the panel area 1351. When the share button 1361 is selected, the user terminal 10 may display a sharing target list 1362 on the right side of the panel area 1351. The sharing target list 1362 may include, for example, a favorite friend list stored in advance.

According to an exemplary embodiment, the user terminal 10 may select one of the plurality of places displayed in the panel area 1351 and share 136 the selected place with one target in the sharing target list 1362. Also, the user terminal 10 may select a plurality of places from among the plurality of places displayed in the panel area 1351 and share 137 the selected plurality of places with a plurality of targets in the sharing target list 1362. In this case, an order may be specified for the plurality of places. For example, in the case of sharing a place for group dining, only a first place may be shared with an executive group, and first-order, second-order, and third-order places may be selected, specified with an order, and shared with a staff group.

According to an exemplary embodiment, when the user terminal 10 shares a map, a link 1381 of the map shared in a chat room may be displayed as notification information on the screen of a counterpart terminal. In this case, on the screen of the counterpart terminal, a plurality of places 1382 selected in the map may be displayed 138 in the preview mode together with the link 1381 of the map in the chat room. Also, information on a specified order of the plurality of places 1382 may be additionally displayed.

Figure 15:
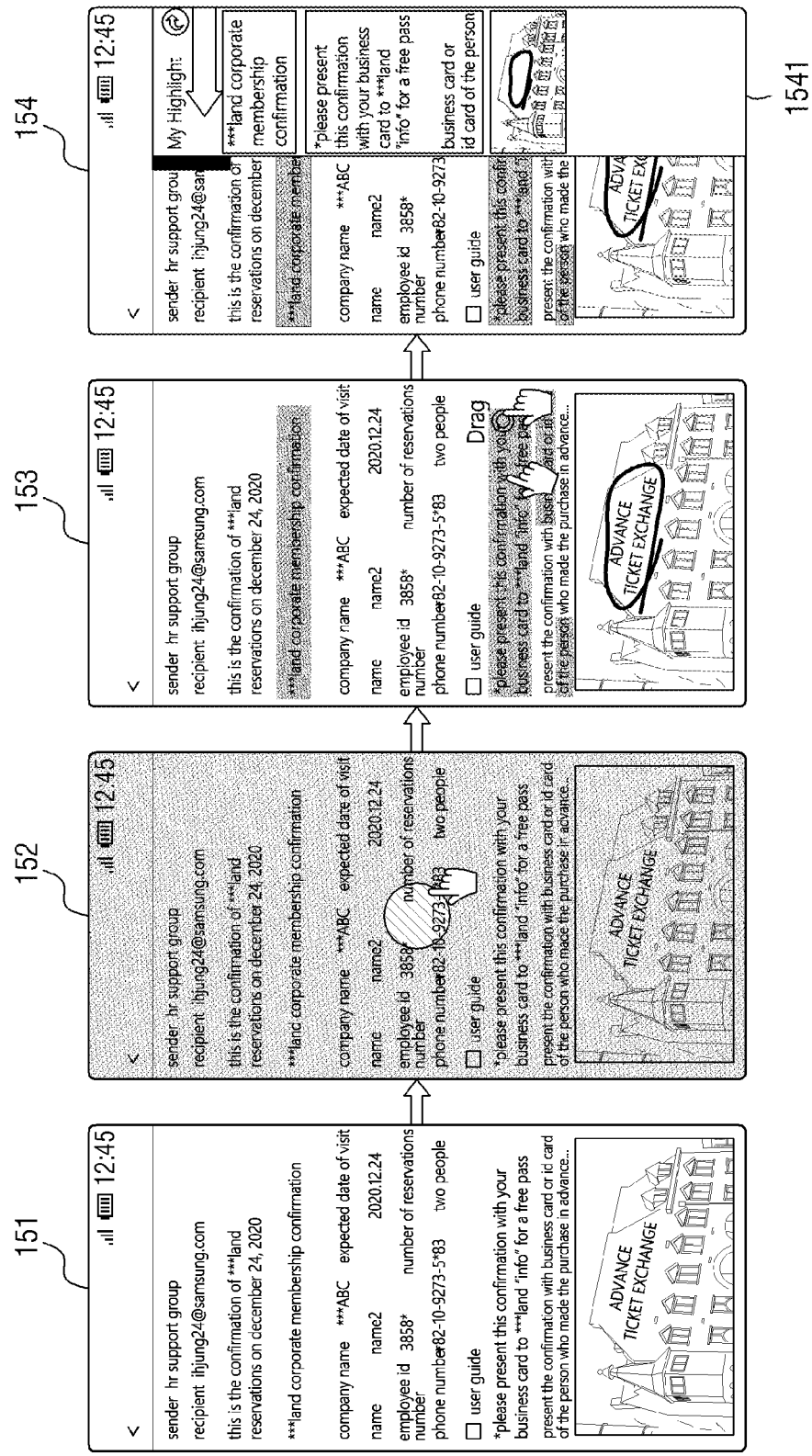
FIGS. 15 and 16 are an example of selecting and sharing an image and text in content according to some exemplary embodiments of the present disclosure.
Figure 16:
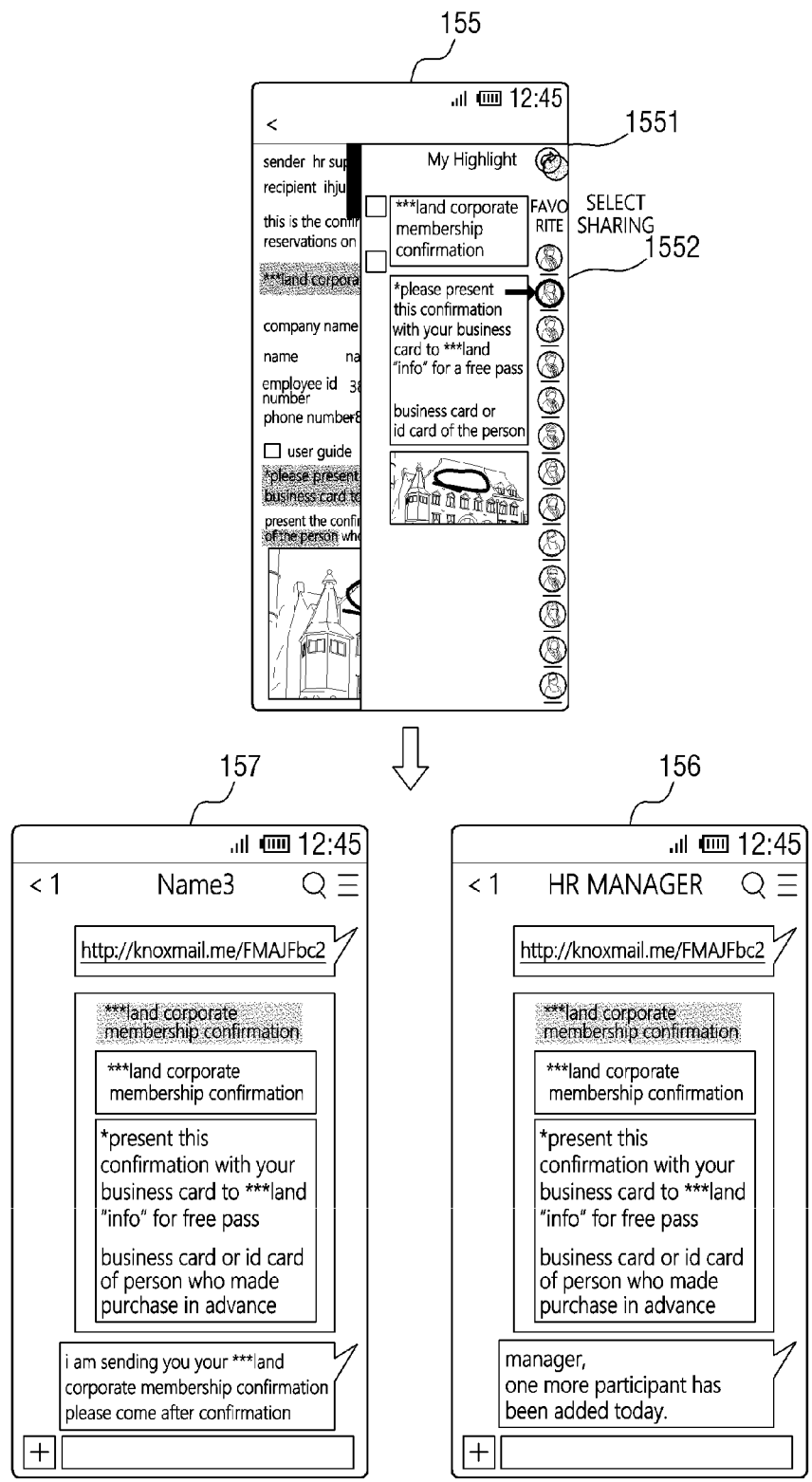

FIGS. 15 and 16 are an example of selecting and sharing an image and text in content according to some exemplary embodiments of the present disclosure.

Referring to FIG. 15, when a long-press input is received 152 for mail content 151 displayed on the screen, the user terminal 10 may be switched to a selection mode 153 for selecting a part of the mail content 151.

In the example shown in the drawing, in the switched selection mode 153, the user terminal 10 may allow selection of a sentence to be shared in the entire page of mail content through a drag input and allow selection of an image to be shared through a circular-mark input. In this case, when a sentence and image are selected in the entire page of the mail content, the selected sentence and image may be displayed 154 in a panel area 1541 on the right side of the screen.

Referring to FIG. 16, the user terminal 10 may display a share button 1551 at the upper right corner of the panel area 1541. When the share button 1551 is selected, a sharing target list 1552 may be displayed 155 on the right side of the panel area 1541. The sharing target list 1552 may include, for example, a favorite friend list stored in advance.

According to an exemplary embodiment, the user terminal 10 may select one or more sentences and images displayed in the panel area 1541 and share the selected sentences and images with an individual or a plurality of targets included in the sharing target list 1552. For example, only text may be selected from among the sentences and images displayed in the panel area 1541 and shared 156 with a first target, and both a sentence and image may be selected and shared 157 with a second target.

Figure 17:
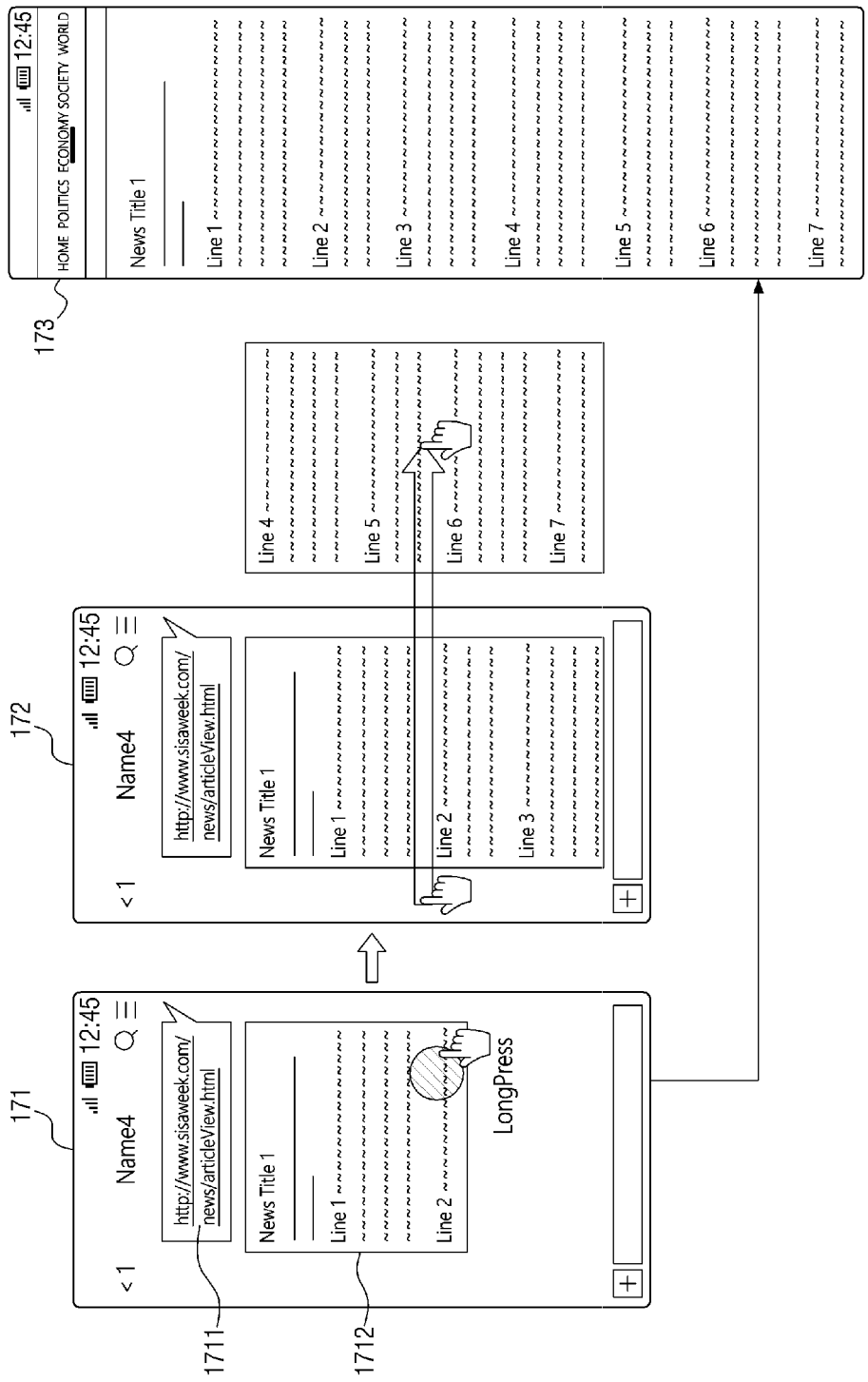
FIGS. 17 and 18 are an example of displaying a highlight part of content shared in a chat window in the preview or detailed view mode according to some exemplary embodiments of the present disclosure.
Figure 18:
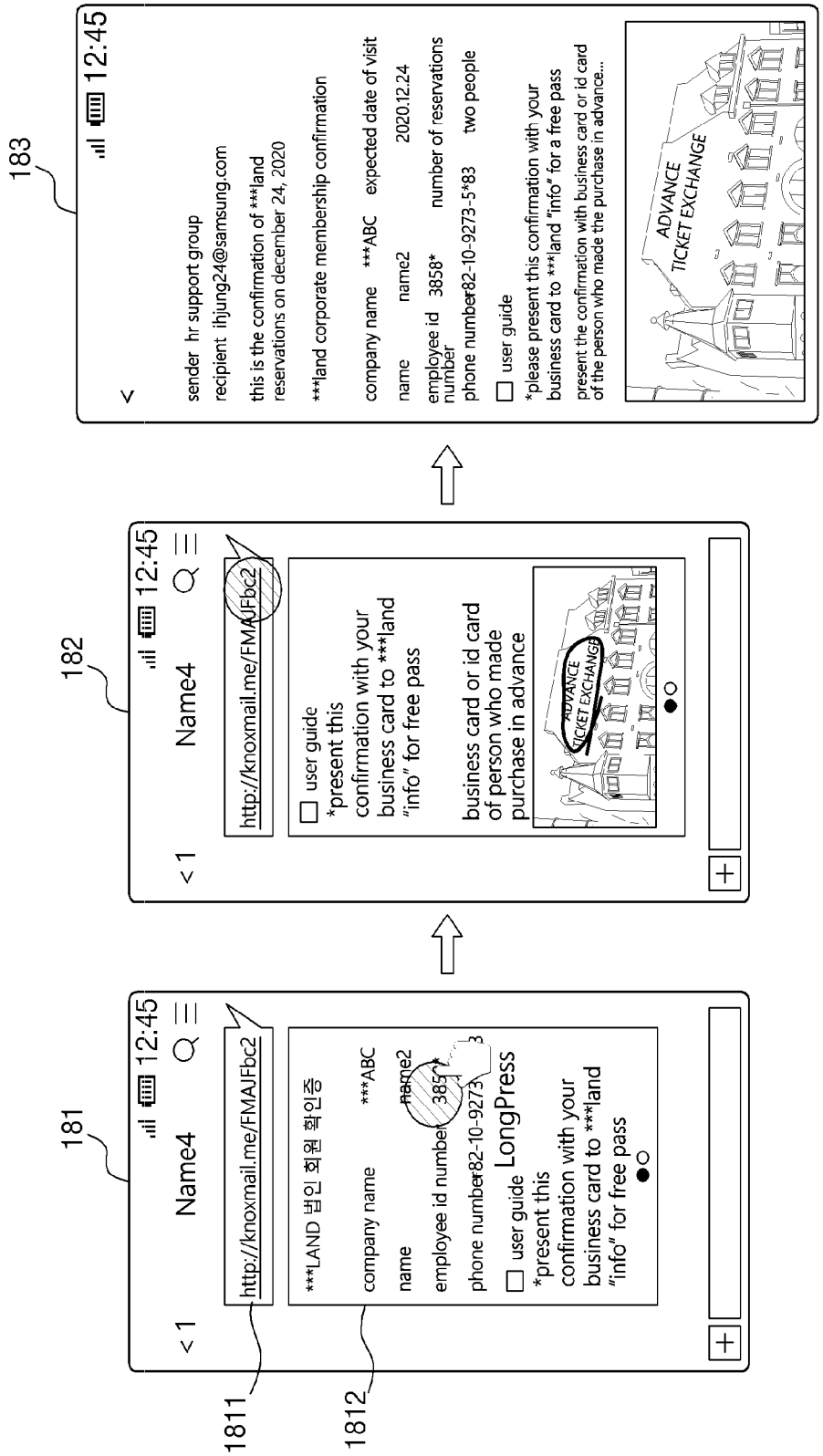

FIGS. 17 and 18 are an example of displaying a highlight part of content shared in a chat window in the preview or detailed view mode according to some exemplary embodiments of the present disclosure.

Referring to FIG. 17, in a chat window displayed on the screen, the user terminal 10 may display URL information 1711 of an Internet article shared by an external device and a partial capture image 1712 of a URL page. The URL information 1711 displayed in the chat window may be a modified URL obtained by adding highlight processing information for some items of the URL page selected at the external device to the original URL of the shared Internet article.

In the example shown in the drawing, when there is a long-press input for the URL information 1711 or the capture image 1712 displayed in the chat window, the items of the URL page which have been selected at the external device and highlighted may be displayed 172 in the preview mode. In the preview mode, the user terminal 10 may separately display the highlighted items of the URL page in a plurality of pages, and a highlighted item displayed in each page may be previewed through a swipe gesture.

According to an exemplary embodiment, when there is a click input for the URL information 1711 or the capture image 1712 displayed in the chat window, the entire page of the URL shared by the external device may be displayed in the overview mode, and the items selected by a user of the external device in the entire page of the URL may be displayed 173 in highlight.

Referring to FIG. 18, the user terminal 10 may display URL information 1811 of mail content shared by an external device and a partial capture image 1812 of the mail content in a chat window displayed on the screen. The URL information 1811 displayed in the chat window may be a modified URL obtained by adding highlight processing information for some items of the mail content selected at the external device to the original URL of the shared mail content.

In the example shown in the drawing, when there is a long-press input for the URL information 1811 or the capture image 1812 displayed in the chat window, the items of the mail content which have been selected at the external device and highlighted may be displayed 182 in the preview mode.

According to an exemplary embodiment, when there is a click input for the URL information 1811 or the capture image 1812 displayed in the chat window, the entire page of the mail content shared by the external device may be displayed in the overview mode, and the items selected by a user of the external device in the entire page of the mail content may be displayed 183 in highlight.

As described above, according to exemplary embodiments of the present disclosure, when content is shared by another user, it is possible to rapidly recognize and display the shared content without a screen change, and thus a user's convenience can be improved.

Figure 19:
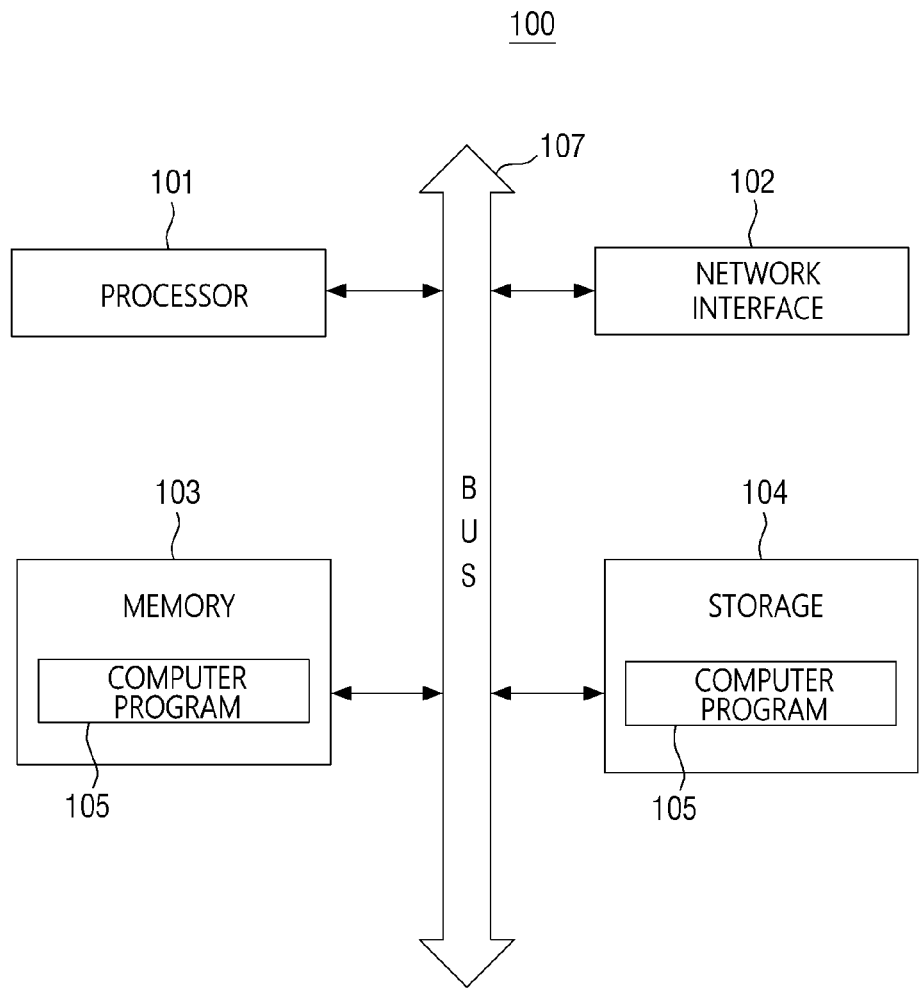
FIG. 19 is a diagram showing a hardware configuration of an exemplary computing device for implementing the methods according to some exemplary embodiments of the present disclosure.

FIG. 19 is a hardware configuration diagram of an exemplary computing device 500.

Referring to FIG. 19, the computing device 100 may include one or more processors 101, a bus 107, a network interface 102, a memory 103, which loads a computer program 105 executed by the processors 101, and a storage 104 for storing the computer program 105. However, FIG. 19 illustrates only the components related to the embodiment of the present disclosure. Therefore, it will be appreciated by those skilled in the art that the present disclosure may further include other general purpose components in addition to the components shown in FIG. 19.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 101 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method of providing an information sharing interface, the method performed by a user terminal, the method comprising:

when a gesture input for content displayed on a screen is received, switching to a selection mode;

receiving a user input for selecting at least a part of items of the content in the selection mode;

displaying the selected items in a panel area located on one side of the screen; and selectively sharing the items displayed in the panel area with at least one target, wherein the receiving of the user input comprises:

receiving a first user input for selecting a first item in a scrollable webpage which is displayed on the screen;

receiving a second user input for scrolling the scrollable webpage; and receiving a third user input for selecting a second item in the scrolled webpage, wherein the displaying of the selected items in the panel area comprises:

displaying the first item in the panel area when the first user input is received; and additionally displaying the second item in the panel area when the third user input is received while the first item is displayed in the panel area, and wherein the selectively sharing the items comprises:

receiving a fourth user input for selecting at least one of the first item and the second item while both the first item and the second item are displayed in the panel area; and sharing the at least one selected item with the at least one target.

2. The method of claim 1, wherein the switching to the selection mode comprises switching to a mode for selecting at least one of text and an image included in the content.

3. The method of claim 1, wherein the gesture input includes a long-press input for the content.

4. The method of claim 1, wherein the receiving of the user input further comprises:

generating and displaying a selection graphical user interface (GUI) for selecting a partial area of an image displayed on the screen; and receiving an input for selecting an object among a plurality of objects in the partial area of the image.

5. The method of claim 4, wherein the selection GUI is a polygonal interface which is resizable up, down, left, and right.

6. The method of claim 1, wherein the displaying of the selected items in the panel area of the screen comprises:

when the items are selected, displaying an icon corresponding to the panel area on one side of the screen; and when the selected items are dragged to the icon, displaying the panel area including the selected items on the one side of the screen.

7. The method of claim 1, wherein the selectively sharing of the items displayed in the panel area with the at least one target comprises:

when a share button displayed in the panel area is selected, displaying a sharing target list, which is stored in advance, on one side of the panel area; and transmitting the items displayed in the panel area to a terminal of a target selected in the sharing target list.

8. The method of claim 1, further comprising storing the items displayed in the panel area.

9. The method of claim 1, further comprising, when an item selected from among the items displayed in the panel area is dragged to the screen outside the panel area, displaying the items excluding the dragged item in the panel area.

10. The method of claim 1, wherein the selectively sharing of the items displayed in the panel area with the at least one target comprises:

transmitting notification information of an item selected from among the items displayed in the panel area to a terminal of the at least one target; and when there is an input for selecting the notification information from the terminal of the at least one target, transmitting the selected item to the terminal of the at least one target.

11. A method of displaying information shared in a chat window, the method comprising:

displaying notification information shared by an external device in the chat window; and displaying content, which is shared by the external device in relation to the notification information, in different modes depending on types of user inputs for the notification information displayed in the chat window, wherein the displaying the content comprises:

displaying at least a part of the items of the content shared by the external device in a preview mode within the chat window without a screen change when a first type of user input is received for notification information, wherein the part of the items includes at least one item selected by the external device; and displaying an entire page of the content shared by the external device in an overview mode when a second type of user input is received for the notification information, wherein the at least one item selected by the external device is highlighted in the overview mode, and wherein the displaying in the preview mode comprises:

configuring one or more pages using at least one item selected by the external device, and if more than one page is configured, displaying each page sequentially by switching pages upon receiving a user input for page transition.

12. The method of claim 11, wherein the displaying of the notification information shared by the external device in the chat window comprises:

receiving uniform resource locator (URL) information of the content shared by the external device; and displaying the received URL information of the content in the chat window as notification information, wherein the URL information includes a modified URL obtained by adding highlight processing information for the at least a part of items of the content selected at the external device to an original URL of the content.

13. The method of claim 11, wherein the first type of user input is a long-press input and the second type of user input is a click input.

14. A user terminal comprising:

a communicator configured to communicate with an external device;

a user input part configured to receive an input of a user;

a display configured to display information; and a processor configured to switch to a selection mode when a gesture input for content displayed on a screen of the display is received, receive a first user input, in the selection mode, for selecting a first item in a scrollable webpage which is displayed on the screen, receive a second user input, in the selection mode, for scrolling the scrollable webpage, receive a third user input, in the selection mode, for selecting a second item in the scrolled webpage, control the display to display the first item in a panel area located on one side of the screen when the first user input is received, additionally display the second item in the panel area when the third user input is received while the first item is displayed in the panel area, receive a fourth user input for selecting at least one of the first item and the second item while both items are displayed in the panel area, and control the communicator to share the at least one selected item with at least one target.

\* \* \* \* \*